United States Patent [19]

Clarke et al.

[11] 4,379,194

[45] Apr. 5, 1983

[54] HIGH PRESSURE DECORATIVE LAMINATES CONTAINING AN AIR-LAID WEB OF FIBERS AND FILLER AND METHOD OF PRODUCING SAME

[75] Inventors: Theodore R. Clarke; John F. Hosler, both of Cincinnati, Ohio

[73] Assignee: Formica Corporation, Wayne, N.J.

[21] Appl. No.: 226,345

[22] Filed: Jan. 19, 1981

[51] Int. Cl.³ .......................... B32B 3/00; B32B 5/02
[52] U.S. Cl. ..................... 428/203; 428/283; 428/326; 428/401; 428/402; 428/407; 428/525; 428/530; 428/531; 428/534; 428/535; 156/62.2
[58] Field of Search ............... 156/62.2; 428/203, 220, 428/530, 534, 525, 531, 535, 537, 283, 326, 401, 402, 407

[56] References Cited

U.S. PATENT DOCUMENTS

| | | | |
|---|---|---|---|
| 3,718,536 | 2/1973 | Downs et al. | 428/2 |
| 3,959,195 | 5/1976 | Eriksson | 428/326 X |
| 4,012,561 | 3/1977 | Doughty | 428/531 |
| 4,061,823 | 12/1977 | McCaskey, Jr. et al. | 428/531 |
| 4,100,324 | 7/1978 | Anderson et al. | 428/401 X |
| 4,127,636 | 11/1978 | Flanders | 428/326 X |

*Primary Examiner*—P. Ives
*Attorney, Agent, or Firm*—Frank M. Van Riet

[57] ABSTRACT

The invention relates to high pressure decorative laminates containing an air-laid web of fibers, filler and resin as a core and to a method of preparing such a decorative laminate from an assembly comprising said substrate and a thermosetting resin impregnated decor sheet.

5 Claims, No Drawings

HIGH PRESSURE DECORATIVE LAMINATES CONTAINING AN AIR-LAID WEB OF FIBERS AND FILLER AND METHOD OF PRODUCING SAME

BACKGROUND OF THE INVENTION

The production of cores comprising cellulosic fibrous sheets and a thermosetting resin composition useful in supporting decorative layers in the formation of high pressure decorative thermoset laminates is well known. Conventionally, said cores comprise a plurality, i.e. about 2–10, of paper core sheets impregnated with a liquid thermosetting resin composition, said core sheets being prepared by treating a web of paper, prepared by a wet-laying process, with a solution or dispersion of a thermosetting resin composition in a volatile solvent, drying said treated web to reduce the volatile matter content to a desired level and cutting said treated, dried paper web into sheets of the required dimensions.

In order to provide satisfactory handling and usage properties in said laminates, they are conventionally produced in thicknesses of from about 0.5 mm to about 2.0 mm, this thickness range being achieved primarily by superimposing the required number of said paper core sheets. While it is recognized that it would clearly be advantageous to use a single sheet to provide the core for the laminate, problems of manufacture and processing associated with the production and resin-impregnation of wet-laid paper sheets having a basis weight significantly greater than about 250 gsm (grams per square meter) and a thickness of greater than about 0.20 mm has prevented their production.

Further, for environmental and energy conservation reasons, it is considered desirable to obviate the drying stage necessary with conventionally produced resin composition treated paper cores. Attempts made in the past to avoid this drying step by providing a wet-laid paper containing a thermo-setting resin composition in solid particulate form as a sheet of the laminate core and formed during the paper making process from an aqueous slurry comprising the paper fibers and the particulate resin failed because of problems arising from the propensity of the liquid phase to convey the resin particles through the forming wire.

Wet-laid papers, while generally producing high pressure decorative laminates of excellent properties, have a propensity to cause stress-cracking of laminates under conditions of low relative humidity. Therefore, conventional high pressure decorative laminates, after a period of time well within their expected life-times, oftimes undergo a marked deterioration in their aesthetic appearance and utility. Conventional high pressure decorative laminates therefore have not always proven useful in areas where low relative humidity is a prevalent condition especially where the laminates are first subjected to modification such as by notching, cutting or other treatment whereby sharp corners are cut into their cross-section.

Wet-laid core papers also exhibit a variation in at least some of their physical properties depending upon whether the properties are measured in the direction of travel of the machine wire upon which the paper was formed, or transversely of it. This variation in properties is due to the non-random orientation of the fibers in the paper due to the alignment of fiber caused by the flow of the liquid phase onto and through the wire and by surface tension effects. Laminates produced from cores comprising said wet-laid papers also exhibit this direction dependent variation in at least some of their physical properties and although this is not generally disadvantageous, there are some applications where a laminate exhibiting less variation in physical properties according to the direction of measurement is preferred.

Recently, it has been found that high pressure decorative laminate produced from a thermosetting resin containing fibrous cellulosic core wherein the disadvantages of laminates made by conventional processes are overcome or diminished may be produced by using, as the core, an air-laid web comprising both cellulosic fibers and a thermosetting resin.

High pressure decorative laminates made from air-laid webs exhibit a toughness superior to laminates which contain, as their core, a plurality of thermosetting resin impregnated Kraft paper sheets. This toughness is evidenced by the laminates' increased resistance to stress-cracking. Furthermore, such high pressure decorative laminates containing an air-laid core also exhibit substantially equivalent uniform strength and dimensional properties regardless of the machine direction from which the measurement is taken.

Air-laid fibrous webs are prepared by disintegrating fibrous, cellulosic material into its component fibers, transporting the fibers to a foraminous moving web-forming surface and depositing the fibers thereon to form a layer with the aid of suction applied to the under side of the web-forming surface. The fibrous, cellulosic material is disintegrated into its component fibers by a machine such as a hammermill or disc refiner and the individual fibers are transported to the forming surface in an air-stream. Binder material is applied to or admixed with the fibers as a particulate solid or as a liquid spray and the web deposited therefrom is then consolidated between nip rollers. When the binder is added as a solid to the air-fiber stream, it may be introduced into the hammermill or thereafter, but before deposition on the forming surface. Additionally, when the binder is used as a spray, the sprayed fibers may thereafter be dried and introduced as such into the forming apparatus.

A known apparatus for forming substrates by air-laying cellulosic fibers comprises: (i) an air-swept hammermill wherein cellulosic material is defibrated into its component fibers in an air-stream, (ii) ducting whereby the fiber containing air-stream is conveyed to a distributor, (iii) a distributor such as disclosed in U.S. Pat. No. 3,581,706, comprising a housing having a perforated planar bottom wall and side walls, one or more impellers mounted to rotate about an axis substantially perpendicular to the bottom wall a short distance above and in non-contacting relationship with the upper surface of said bottom wall, inlet means for the fiber containing air-stream to enter the distributor, outlet means whereby fibrous material may be recycled to the hammermill and, optionally, a plate member located above said impellers and extending inwardly from the side walls of the housing so as to form a partition between a lower part and an upper part of said housing, said distributor being positioned so that the bottom wall is cooperatively located above the upper surface of (iv) a moving, foraminous belt upon the upper surface of which the cellulosic fibers are deposited to form a layer with the aid of (v) means for applying suction to the under surface of said belt and (vi) means for compacting the so-deposited cellulosic fiber layer, see U.S. Pat. Nos. 2,698,271 and 4,014,635.

When apparatus of the type described above is used in the production of an air-laid cellulosic fibrous layer, there are a large number of variables that must be controlled in order that optimum formation of the layer occurs. These variables include the input rate of the cellulosic material to the hammermill, the speed of rotation of the impellers and speed of travel of the belt and the degree of compaction applied. When preparing a core adapted for use in the production of high pressure decorative laminates, the thermosetting resin must be uniformly distributed throughout the deposited layer and there must be sufficient of the resin present to provide the desired properties to the heat and pressure consolidated laminate. In the production of such high pressure decorative laminates, the resin content of the core lies in the range from about 10% to about 40% by weight, preferably from about 25% to about 30%, based on the total weight of the core.

Additionally, for the formation of an air-laid core having the desired uniformity of composition and basis weight and comprising fibers and thermosetting resin, such as by means of an apparatus of the type described above, it is preferable to operate under conditions such that the air has a relative humidity within the range of about 40% to 80%, preferably about 50% to 70% in order to prevent deposition problems which may arise in that at too high a humidity, clogging of the ducting and screen may occur, while at too low a humidity, problems may arise due to static electrical charges on the fibers.

In the production of decorative laminates from either wet-laid or air-laid cores various forms of waste material are produced in the finishing operations necessary in connection with manufacture of these decorative laminates. One of the operations performed upon the finished laminates i.e. those recovered upon removal thereof from the laminating press, consists of trimming all the peripheral edges of each laminate in order to remove "flash", i.e. any portion of the laminate periphery which is not fully consolidated during lamination. This material is very brittle and detracts from the overall appearance of the laminate. A second operation performed upon the finished laminates is the sanding of the back or reverse side thereof so as to provide a good surface for bonding of the laminate to a suitable underlayment via the use of a contact adhesive. Also, the finished laminates are oftimes cut to size in order to supply the ultimate consumer with a variety of lengths and widths for fabrication into commercial articles, resulting in cutting dust.

The waste or offal produced by the trimming, sanding and cutting operations is a major concern to laminate manufacturers because during these finishing operations as much as 14% of the weight of the final laminate may be removed. Thus, the waste created can cause significant handling, disposal, environmental and energy concerns.

Additionally, other forms of waste accrue. That is to say, during the course of producing the components which go into the ultimate laminates i.e. the overlay sheets, the decor sheets etc., objectionable or sub-quality material may be produced which is not suitable for producing a quality laminate and therefore must be discarded. Additionally, other waste material may be generated during the laminating operation per se in the form of imperfect laminates, i.e. laminates with physical deficiencies, surface imperfections and the like.

If a use for these above-described waste materials could be found such that even a portion of the material usually discarded, burned or otherwise disposed of could be reused, a long felt need in the laminating industry would be solved.

SUMMARY OF THE INVENTION

It has now been found that high pressure decorative laminates produced from a thermosetting resin containing fibrous cellulosic core may be produced by using as the core, an air-laid web comprising (a) cellulosic fibers, (b) from about 1% to about 20% of a pulverized filler and (c) a thermosetting resin.

The novel high pressure decorative laminates of the present invention exhibit a toughness superior to laminates produced conventionally which contain, as their core, a plurality of thermosetting resin impregnated kraft paper sheets and also substantially retain the uniform strength and dimensional properties of laminates produced from air-laid webs which do not contain the recycled waste filler.

Furthermore, the disclosed method of recycling the plant waste materials into a useful, viable laminate core component, reduces the need for the disposal of these materials by other more costly means. Thus, the method provides for a significant pollution control in the making of laminates.

DESCRIPTION OF THE INVENTION INCLUDING PREFERRED EMBODIMENTS

According to the instant invention, there is provided a heat and pressure consolidated decorative laminate comprising, in superimposed relationship:

(I) a thermoset resin containing, monostichous core of air-laid, randomly oriented, substantially non-hydrogen bonded cellulosic fibers having an average length of 0.5 to 2.5 mm, said core being from about 0.25 mm to about 2.25 mm thick, containing from about 10% to about 40% by weight, of resin, based on the total weight of fiber and resin in I and from about 1% to about 20%, by weight, based on the total weight of said fiber, of a pulverized filler;

(II) a thermoset resin impregnated cellulosic decor sheet and optionally, (III) a thermoset resin impregnated alpha-cellulosic overlay sheet.

In accordance with the instant invention, the method for preparing the thermoset, high pressure, decorative laminates comprises:

(1) forming a laminate assembly comprising, in superimposed relationship:

(A) a monostichous, air-laid core of randomly oriented fibers of 0.5-2.5 mm average length, containing from about 10-40% of a thermosetting resin and from about 1% to about 20%, by weight, same basis as above, of a pulverized filler and of sufficient thickness to provide, when consolidated, from about 0.25 mm to about 2.25 mm in thickness to the resultant laminate, (B) a thermosetting resin impregnated decor sheet and optionally, (C) a thermosetting resin impregnated alpha-cellulose overlay sheet; and (2) consolidating said assembly to a unitary thermoset laminate structure by the application of heat and pressure thereto.

The thermosetting resin containing monostichous core of randomly oriented, substantially non-hydrogen bonded cellulosic fibers is formed using an apparatus of the type described above, by:

(a) feeding fibrous, cellulosic material to a defibrator such as an air-swept hammermill and defibrating the material therein to provide cellulosic fibers of an average length of about 0.5 to 2.5, preferably about 0.75 to 2.0 mm, in the presence of humidified air, the relative humidity of which ranges from about 40% to about 80% to thereby form an air-fiber stream;

(b) incorporating into said air-fiber stream from about 10% to about 40% by weight, of a thermosetting resin, said weight being based on the total weight of resin and fiber, and from about 1 to about 20% by weight, based on the total weight of fiber, of a pulverized filler, to thereby form an air-fiber-filler-resin stream;

(c) passing said air-fiber-filler-resin stream to a distributor;

(d) agitating said stream within the distributor by impeller means;

(e) causing said stream to pass through the perforated bottom wall of the distributor;

(f) depositing the fibers, filler and resin onto a moving foraminous belt to form a layer having a thickness of from about 5 mm to about 100 mm, preferably about 10 mm to 80 mm by the operation of the suction means, and (g) pre-consolidating the deposited layer to a thickness of from about 0.5 mm to about 10.0 mm, preferably about 1.0 to about 8.0 mm.

The fibrous, cellulosic material employed may comprise any material such as chemical, semi-chemical or mechanical paper pulp, cardboard and waste paper and the like, provided that after defibration in the hammermill it comprises fibers of an average length of 0.5 mm to 2.5 mm. Although fibers produced from wood are preferred, fibers produced from straw, grass, bagasse, cotton or synthetics, may be used alone or in admixture. If the cellulosic material feed is in bulk form, then it is preferred to use a balebreaker or similar equipment to partially disintegrate the material before it is fed to the hammermill.

The air fed to the hammermill may be humidified to the above-specified extent either internally or externally of the core forming apparatus. Thus, the apparatus may be situated in a room, the air in which is humidified to the required degree and drawn through the apparatus at the required rate. Alternatively, the air may be drawn into the apparatus and there humidified such as by steam or water spray means to the required level. It is preferred to humidify the air internally of the apparatus as such allows for quicker adjustment of the humidity than is possible with external humidification and further allows the room air to be controlled independently so as to provide more amenable working conditions.

The said thermosetting resin may comprise any thermosetting resin which provides the required properties in the core prepared therefrom. The resin may comprise, for example, a phenol-formaldehyde resin, a melamine-formaldehyde resin, a polyester resin or an epoxy resin and said resins may comprise known extenders, if desired. It is preferred to employ a particulate, thermosetting resin and even more preferred to employ a phenol-formaldehyde resin. Such a particulate resin may be prepared by forming a solid, thermosetting resin in bulk or lump form and then grinding or crushing to provide the desired particle size or, more preferably, it may be prepared in particulate form by known emulsion or suspension condensation techniques. The mean particle size of the thermosetting resin should range from about 20 microns to about 200 microns, preferably from about 50 to 150 microns.

The filler material used herein may comprise any of the waste or offal materials discussed above associated with the production of decorative laminates. Thus, the filler material may constitute laminate sanding dust, laminate cutting dust, laminate edge trimmings (flash), laminate pieces, resin impregnated papers and the like. The filler must be of such a size that it will not create a distorted surface in the laminate produced from the core containing the same. It is essential that the particle size thereof accordingly be adjusted such as by pulverization to no larger than about 200 microns with from about 50 to 150 microns being preferred.

The thermosetting resin and the pulverized filler may be incorporated into the air-fiber stream by any suitable means and at any suitable position. Thus the resin and/or filler may be introduced into the hammermill, into the ducting between the hammermill and the distributor, or into the distributor. Suitable introductory means are known and include spraying means, gate-valves, vibratory- and screw-feeders etc. It is preferred to employ screw feeders which employ a positive feed principle and can be controlled more precisely to give the feed rate of resin and/or filler desired.

The air-laid layer may be pre-consolidated between platens or nip rollers as may be most convenient and the pre-consolidating means may be heated or cooled, if desired. If they are heated, then the pre-consolidation must be such that while there may be some conversion of a minor amount of the thermosetting resin to the thermoset form, a substantial proportion of the resin is still in the thermosetting form after the pre-consolidation operation. The air-laid layer, before pre-consolidation, must be of such a thickness that after heat and pressure consolidation during laminate formation the core of said laminate will range in thickness from about 0.25 mm to about 2.25 mm. Air-laid webs deposited on the belt, which may be constructed of metal or other material such as plastic, cloth etc., are deposited at the pre-consolidation thickness specified above.

The thermosetting resin impregnated decor sheet employed in the present invention may comprise any of those decor sheets known to provide the decorative surface on a decorative laminate and includes decorative woven or non-woven fabrics, colored or printed paper sheets, wood veneer, cork, and the like. The resin may be of any of those known for use in the production of thermoset laminates but it is preferred to use those 'noble' thermosetting resins by which is meant those resins which show no appreciable darkening or color change on conversion from the thermosetting to the thermoset state.

When a decorative woven or non-woven fabric sheet or a printed paper sheet is employed, it is preferred to use, in addition thereto, a surfacing overlay sheet known for use in the production of conventional thermoset laminates. More especially, it is preferred to use a light weight, high quality, unfilled, alpha-cellulose paper sheet impregnated with the same kind of thermosetting resin composition as used to impregnate the decorative sheet and, still more preferably, an overlay sheet impregnated with a thermosetting melamine-formaldehyde resin may be employed.

The optional overlay sheet may comprise any of those overlay sheets known to provide a protective, abrasion-resultant surface to decorative laminates. Preferably, these overlay sheets comprise alpha-cellulose paper which is impregnated with a noble thermoset resin, preferably melamine/formaldehyde, and which become transparent upon heat and pressure consolidation of the laminate assembly.

The heat and pressure consolidation is suitably carried out using that machinery, equipment, press-plates, temperature, pressure and press-time used for preparing decorative thermo-set laminates from the conventional impregnated kraft paper core layers. Pressures ranging from about 700 to about 1400 psi and temperatures ranging from about 120° to 150° C.

The laminate assembly is consolidated by heat and pressure so that in the high pressure thermoset laminate the thickness of the air-laid substrate is reduced by a factor of about two to about ten. More especially, it is preferred to effect the heat and pressure consolidation so that in the product laminate, the substrate has a thickness of from about 0.25 mm to about 2.25 mm, as mentioned above.

Further, while it is preferred to prepare laminates comprising a single core made in accordance with the invention, a single thermosetting resin impregnated decor sheet and, optionally, a thermosetting resin impregnated alpha-cellulose overlay sheet, the invention is not so limited and also encompasses laminates comprising a core produced from more than one monostichous, non-hydrogen bonded, air-laid web, the noble thermosetting resin impregnated decor sheet and, optionally, the noble thermosetting resin impregnated overlay sheet.

The following examples are set forth for purposes of illustration only and are not to be construed as limitations on the present invention except as set forth in the appended claims. All parts and percentages are by weight unless otherwise specified.

EXAMPLE A

Defibrated kraft linerboard fibers are mixed with powdered phenol/formaldehyde resin and formed onto a stationary screen with the aid of suction applied to the underside of a screen. The resultant fiber-resin layer has a thickness of 46 mm, a density of 0.035 g/c.c., a basis weight of 1600 gsm and a fiber to resin weight ratio of 3:1. The deposited fiber-resin layer is preconsolidated, at a pressure of 2300 psi, to a thickness of 2.25 mm.

After conditioning the compacted monostichous, fiber-resin core layer at 60% relative humidity for 24 hours, a decorative thermoset resinous laminate assembly is formed comprising:

(a) the above monostichous core layer, (b) a printed decor paper impregnated with a thermosetting melamine/formaldehyde resin to a resin content of about 40% and, (c) an alpha-cellulose overlay sheet impregnated with a thermosetting melamine/formaldehyde resin to a resin content of about 60%.

After positioning between separating sheets, the assembly is heat and pressure consolidated at 1400 psi and 145° C. to a unitary thermoset decorative laminate with a thickness of 1.12 mm.

EXAMPLES

Sanding Dust and Trim Saw Waste

Sanding dust and trim saw wastes in two particle size ranges are evaluated, a coarse material with a particle size of from 0.033" to 0.008" and a fine material with most of the material less than 0.003". The coarse materials are collected directly from sanders or trim saws. Large slabs and pieces are removed by screening through a 20 mesh per inch sieve and only the portion which passes through the sieve is used. The accepted material has the texture of coarse sand. Characteristics of the fine or pulverized filler materials are shown in Table 1.

TABLE 1

| CHARACTERISTICS OF PULVERIZED FILLERS | | |
|---|---|---|
| ANALYSIS | SANDING DUST | TRIM SAW WASTE |
| 2000 microns | 0.0 | 0.0 |
| 710 microns | 4.8 | 0.1 |
| 212 microns | 39.3 | 7.1 |
| 150 microns | 16.3 | 11.6 |
| Smaller than 150 microns | 36.9 | 78.7 |
| % VOLATILE | 4.03 | 4.75 |
| WATER SOLUBLE PHENOL Mg/g | 2.2 | 9.4 |
| WATER SOLUBLE PHENOLIC Mg/g | 14.2 | 35.0 |
| ASH CONTENT, % | 1.01 | 6.16 |
| ACID INSOLUBLE ASH, % | 0.39 | 5.20 |

Cores are made using normal procedures but either 5, 10, or 20% of the fiber is replaced with the respective filler material. Each core has 30% resin therein. The cores are pressed with melamine/formaldehyde resin impregnated print and trans sheets at 145° C. and 1400 psi for 20 minutes. One laminate is pressed without print and trans sheets for core machinability testing. Core only laminates are made using other available fiber sources to determine machinability between different type of fibers.

Results in Tables 2, 3 and 4 show that physical properties of the laminates with fillers are equivalent to those of the control without fillers. Water absorption and thickness swell are equivalent but dimensional change increased slightly at higher filler contents.

The addition of the coarse materials, Table 2, results in a somewhat rough appearance in the print surface if larger amounts of filler are used. The rough appearance is caused by the inability of the hard particles to compress and the resulting high pressure in these areas. No surface roughness is evident when using the rough materials at lesser amounts.

Treated Decorative Print and Transparent Overlay

Sheet stock of melamine/formaldehyde resin impregnated decorative print and transparent overlay is disintegrated in a 140 mm hammermill. The disintegrated materials are then mixed with fiber, cores made and laminate pressed the same as for the sanding dust evaluation. At the 20% filler addition level, the quantity of resin added is reduced to compensate for the resins in the treated sheets.

When the treated print and trans are disintegrated in the hammermill, no sticking is evident within the mill. Some dusting, however, is experienced during the grinding. Table 5 shows that the physical properties of the laminates with different filler levels remain essentially unchanged. Water absorption and thickness swell decrease as the filler addition levels increase. At 20% filler addition, acceptable test levels are achieved after reductions of resin addition of 5 and 10% for print and trans addition, respectively. The difference in machinability between samples indicate that some increase in tool wear may be experienced when adding, decorative print but not by adding transparent overlay.

TABLE 2

EVALUATION OF COARSE[1] SANDING DUST & TRIM SAW WASTE

| Example No. | 1[C] | 2 | 3 | 4 | 5 | 6 | 7 | 8 | 9 | 10 |
|---|---|---|---|---|---|---|---|---|---|---|
| Phenolic Resin (Solid) | | | | | | | | | | |
| Added, % | 30 | 30 | 30 | 30 | 30 | 30 | 30 | 30 | 30 | 30 |
| Retained, % (in core) | 24.9 | 23.8 | 22.1 | 26.1 | 24.2 | 23.1 | 24.5 | 21.9 | — | 2.62 |
| Fiber (Linerboard) | | | | | | | | | | |
| % | 100 | 95 | 90 | 80 | 60 | 95 | 90 | 80 | 90 | 80 |
| Filler | | | | | | | | | | |
| Sanding Dust, % | 0 | 5 | 10 | 20 | 40 | 0 | 0 | 0 | 5 | 10 |
| Trim Saw Waste, % | 0 | 0 | 0 | 0 | 0 | 5 | 10 | 20 | 5 | 10 |
| Laminate Properties, Sanded | | | | | | | | | | |
| Basis Weight, gms | 1653 | 1732 | 1780 | 1713 | 1612 | 1727 | 1713 | 1581 | 1692 | 1696 |
| Density, kg/m$^3$ | 146 | 144 | 144 | 144 | 136 | 142 | 143 | 139 | 136 | 142 |
| Water Absorption, % | 6.69 | 5.80 | 6.14 | 5.91 | 8.44 | 6.37 | 6.86 | 9.12 | 6.38 | 7.93 |
| Thickness Swell, % | 7.40 | 5.34 | 5.44 | 4.91 | 5.14 | 6.27 | 5.86 | 6.62 | 6.43 | 6.80 |
| Dimensional Change | | | | | | | | | | |
| High Humidity, % | 0.321 | 0.343 | 0.350 | 0.356 | 0.407 | 0.305 | 0.324 | 0.325 | 0.343 | 0.350 |
| Low Humidity, % | 0.786 | 0.783 | 0.822 | 0.876 | 0.924 | 0.770 | 0.808 | 0.862 | 0.815 | 0.818 |
| Gross, % | 1.107 | 1.126 | 1.172 | 1.232 | 1.331 | 1.075 | 1.132 | 1.187 | 1.158 | 1.168 |
| Tensile, mPa | 86.7 | 82.1 | 81.7 | 87.5 | 80.8 | 86.1 | 78.3 | 84.1 | 82.4 | 79.9 |
| Modulus, mkPa | 4.78 | 4.60 | 4.80 | 4.71 | 4.42 | 4.70 | 4.83 | 4.65 | 4.52 | 4.58 |
| Core Machinability[2] | 6.0 | 6.0 | 6.0 | 6.0 | 6.0 | 6.0 | 6.0 | 6.0 | 6.0 | 6.0 |
| Stress Crack, Hrs. | 92+ | 92+ | 92+ | 92+ | 15 | 92+ | 92+ | 48+ | 92+ | 92+ |
| Surface Appearance[3] | 0 | 0 | 1 | 2 | 2 | 1 | 2 | 2 | 2 | 2 |

[1]Particle Size Average 50-200 microns
[2]3.0 to 8.0 - Typical of non-aggressive kraft laminate.
[3]0 = Smooth, 1 = Slight irregularities, 2 = Very rough (orange peel appearance).
[C]Comparative

TABLE 3

EVALUATION OF PULVERIZED SANDING DUST

| EXAMPLE No. | 11[C] | 12 | 13 | 14 | 15[C] | 16 | 17 | 18[C] | 19 | 20 |
|---|---|---|---|---|---|---|---|---|---|---|
| Phenolic Resin (Solid) | | | | | | | | | | |
| Added, % | 30 | 30 | 30 | 30 | 30 | 30 | 30 | 30 | 30 | 30 |
| Retained, % (in core) | 20.4 | 23.4 | 23.6 | 21.4 | 30.0 | 28.0 | 29.0 | 22.0 | 21.0 | 24.2 |
| Fiber | | | | | | | | | | |
| Type | | Linerboard | | | | Saturating | | | Linerboard | |
| % | 100 | 95 | 90 | 80 | 100 | 90 | 80 | 100 | 90 | 80 |
| Filler | | | | | | | | | | |
| Sanding Dust, % | 0 | 5 | 10 | 20 | 0 | 10 | 20 | 0 | 10 | 20 |
| Laminate Properties, Sanded | | | | | | | | | | |
| Basis Weight, gms | 1671 | 1759 | 1600 | 1624 | 1551 | 1583 | 1541 | 1619 | 1604 | 1596 |
| Density, kg/m$^3$ | 144 | 145 | 140 | 142 | 145 | 138 | 137 | 142 | 144 | 143 |
| Thickness, Swell, % | 6.14 | 4.98 | 5.87 | 5.85 | | | | | | |
| Water Absorption, % | 7.67 | 6.96 | 7.38 | 7.43 | | | | | | |
| Dimensional Change, Length | | | | | | | | | | |
| High Humidity, % | 0.510 | 0.484 | 0.521 | 0.534 | | | | | | |
| Low Humidity, % | 0.519 | 0.532 | 0.539 | 0.546 | | | | | | |
| Gross, % | 1.029 | 1.016 | 1.060 | 1.080 | | PHYSICAL PROPERTIES NOT TESTED | | | | |
| Dimensional Change, Cross | | | | | | | | | | |
| High Humidity, % | 0.539 | 0.554 | 0.570 | 0.550 | | | | | | |
| Low Humidity, % | 0.602 | 0.617 | 0.622 | 0.626 | | | | | | |
| Gross, % | 1.141 | 1.171 | 1.192 | 1.176 | | | | | | |
| Tensile, mPa | 85.6 | 76.0 | 90.9 | 79.8 | | | | | | |
| Modulus, mkPa | 4.80 | 4.65 | 5.08 | 4.71 | | | | | | |
| Core Machinability[1] | 12.0 | 12.0 | 10.5 | 12.0 | 1.0 | 7.0 | 7.0 | 4.0 | 6.0 | 6.0 |
| Ash, % | 1.67 | — | 1.72 | — | | | | | | |
| Surface Appearance[2] | 0 | 0 | 0 | 0 | | | | | | |

[1]3.0 to 8.0 - Typical of non-aggressive kraft laminate.
[2]0 - smooth, 1 = Slight irregularities, 3 = Very Rough.
[C]Comparative

TABLE 4

EVALUATION OF PULVERIZED TRIM SAW WASTE

| EXAMPLE No. | 21[C] | 22 | 23 | 24 | 25[C] | 26 | 27 | 28[C] | 29 | 30 |
|---|---|---|---|---|---|---|---|---|---|---|
| Phenolic Resin (Solid) | | | | | | | | | | |
| Added, % | 30 | 30 | 30 | 30 | 30 | 30 | 30 | 30 | 30 | 30 |
| Retained, % (in core) | 20.4 | 19.0 | 23.9 | 22.9 | 30.0 | 30 | 32.0 | 22.0 | 24.0 | 25.2 |
| Fiber Type | Linerboard | Linerboard | Linerboard | Linerboard | Saturating | Saturating | Saturating | Linerboard | Linerboard | Linerboard |
| % | 100 | 95 | 90 | 80 | 100 | 90 | 80 | 100 | 90 | 80 |
| Filler Trim Saw Waste, % | 0 | 5 | 10 | 20 | 0 | 10 | 20 | 0 | 10 | 20 |
| Laminate Properties, Sanded | | | | | | | | | | |
| Basis Weight, gms | 1671 | 1743 | 1604 | 1695 | 1551 | 1551 | 1570 | 1619 | 1619 | 1642 |
| Density, kg/m³ | 144 | 145 | 144 | 144 | 145 | 139 | 144 | 142 | 139 | 140 |
| Thickness Swell, % | 6.14 | 6.14 | 5.62 | 5.33 | | | | | | |
| Water Absorption, % | 7.67 | 6.93 | 6.81 | 6.37 | | | | | | |
| Dimensional Change, Length | | | | | | | | | | |
| High Humidity, % | 0.510 | 0.486 | 0.534 | 0.544 | PHYSICAL PROPERTIES NOT TESTED | | | | | |
| Low Density, % | 0.519 | 0.522 | 0.533 | 0.558 | | | | | | |
| Gross, % | 1.029 | 1.008 | 1.067 | 1.102 | | | | | | |
| Dimensional Change, Cross | | | | | | | | | | |
| High Humidity, % | 0.539 | 0.548 | 0.555 | 0.573 | | | | | | |
| Low Humidity, % | 0.602 | 0.584 | 0.637 | 0.629 | | | | | | |
| Gross, % | 1.141 | 1.132 | 1.192 | 1.202 | | | | | | |
| Tensile, mPa | 85.6 | 72.6 | 74.9 | 82.8 | | | | | | |
| Modulus, mkPa | 4.80 | 4.75 | 4.56 | 4.54 | | | | | | |
| Core Machinability[1] | 12.0 | 14.5 | 13.0 | 14.0 | 1.0 | 3.0 | 2.0 | 4.0 | 4.0 | 4.0 |
| Ash, % | 1.67 | — | 2.40 | — | | | | | | |
| Surface Appearance[2] | 0 | 0 | 0 | 0 | | | | | | |

[1]3.0 to 8.0 - Typical of non-aggressive kraft laminate.
[2]0 = Smooth, 1 = Slight irregularities, 2 = very rough.
[C]Comparative

TABLE 5

EVALUATION OF TREATED DECORATIVE PRINT & TRANSPARENT OVERLAY

| EXAMPLE No. | 31 | 32 | 33 | 34 | 35 | 36 | 37 | 38 |
|---|---|---|---|---|---|---|---|---|
| Phenolic Resin (Solid) | | | | | | | | |
| Added, % | 30 | 30 | 30 | 30 | 30 | 30 | 35 | 25 |
| Retained, % (in core) | 22.2 | 26.5 | 25.8 | 27.8 | 25.7 | 28.4 | 32.1 | 23.7 |
| Fiber (Linerboard) % | 95 | 90 | 80 | 80 | 95 | 90 | 80 | 80 |
| Filler | | | | | | | | |
| Print, % | 5 | 10 | 20 | 20 | 0 | 0 | 0 | 0 |
| Trans, % | 0 | 0 | 0 | 0 | 5 | 10 | 20 | 20 |
| Laminate Properties, Sanded | | | | | | | | |
| Basis Weight, gms | 1562 | 1582 | 1573 | 1568 | 1551 | 1536 | 1563 | 1582 |
| Density, kg/m³ | 145 | 143 | 145 | 147 | 144 | 143 | 144 | 144 |
| Thickness Swell, % | 6.36 | 6.37 | 5.30 | 6.91 | 7.16 | 5.91 | 5.69 | 6.92 |
| Water Absorption, % | 8.11 | 7.68 | 6.90 | 7.90 | 8.72 | 8.30 | 7.77 | 8.76 |
| Dimensional Change | | | | | | | | |
| High Humidity, % | 0.466 | 0.435 | 0.428 | 0.468 | 0.602 | 0.587 | 0.588 | 0.480 |
| Low Humidity, % | 0.514 | 0.532 | 0.493 | 0.516 | 0.548 | 0.562 | 0.564 | 0.546 |
| Gross, % | 0.980 | 0.967 | 0.921 | 0.984 | 1.150 | 1.149 | 1.152 | 1.026 |
| Tensile, Length, mPa | 85.8 | 82.0 | 85.5 | 83.2 | 80.8 | 76.6 | 88.7 | 90.3 |
| Cross, mPa | 77.6 | 78.9 | 74.2 | 83.2 | 78.7 | 79.3 | 72.0 | 72.2 |
| Modulus, Length, mkPa | 4.70 | 4.51 | 4.82 | 4.73 | 4.62 | 4.33 | 4.53 | 4.78 |
| Cross, mkPa | 4.62 | 4.55 | 4.50 | 4.64 | 4.26 | 4.37 | 4.41 | 4.66 |
| Core Machinability | 7.0 | 6.0 | 8.0 | 9.0 | 6.5 | 7.0 | 5.0 | 6.0 |

EXAMPLE 39

When the procedure of Example 3 is repeated except that a continuous commercial apparatus is employed, similar results are achieved.

The apparatus employed essentially comprises: an electrically driven, air-swept hammermill connected by suitable ducting to a distributor; screw-feed means arranged to feed particulate thermosetting resin into the ducting between the hammermill and the distributor; a distributor comprising a housing having side-walls and end-walls and a perforated planar bottom-wall and side walls, impeller means mounted to rotate about an axis substantially perpendicular to the bottom-wall a short distance above and in non-contacting relationship with the upper surface of said bottom-wall, inlet means for the fiber-containing stream, outlet means whereby fibrous materials are recycled to the hammermill, a plate member located above said impellers and extending inwardly from the side-walls so as to form a partition between the lower part and an upper part of the housing, said distributor being positioned so that the bottom-wall is located above and co-operates with a moving foraminous belt and said side-walls and end-walls being provided with means to restrict passage of air between their lower extremeties and said belt; a moving, foraminous metal mesh belt positioned above and co-operating with suction means positioned therebelow and a pair of metal compaction rollers mounted so as to act in nip relationship on said belt and a deposited layer thereon.

Soft wood sulphate kraft having a kappa number of 32 is fed to the air-swept hammermill where it is defibrated to provide cellulosic fibers having an average fiber length of about 1 mm. Air, humidified to 70% relative humidity by steam injecting means, is fed to the hammermill at a rate of 38.6 cubic meters per kilogram of fibers to produce an air-fiber stream. Solid particulate thermosetting phenolic resin having a mean particle size of about 25 microns and laminate sanding dust of less than 100 microns are incorporated by the screw-feeder means into the air-fiber stream to provide an air-fiber-filler resin stream wherein the ratio of resin to fiber was about 1 part to 3 parts, by weight. The air-fiber-filler-resin stream is then passed to the distributor, whence by action of the suction means and the impeller means, the stream is caused to pass through the perforated bottom-wall thereof and to deposit as a fiber-filler-resin layer having a basis weight of 1560 gsm a density of 0.029 g/cc and a thickness of 54 mm upon the foraminous belt which is moving at a speed of 0.8 meters/minute.

The belt and the deposited fiber-resin layer are then passed through the nip of the compaction rollers which exert thereon a line pressure of about 45 Kg/cm and preconsolidation thereof. The material emergent from the nip is separated from the belt as a thermo-setting phenolic resin containing monostichous substrate of randomly oriented substantially non-hydrogen bonded cellulosic fibers of about 3.6 mm in thickness containing 33%, by weight, of the resin.

The core formed is used to prepare a high pressure thermoset decorative laminate assembly by arranging in superimposed relationship:

(a) the monostichous substrate;

(b) a printed, paper decor sheet impregnated with a thermosetting melamine-formaldehyde resin to a resin content of about 40%; and (c) an alpha cellulose overlay sheet impregnated with a thermosetting melamine-formaldehyde resin to a resin content of about 50%.

The assembly thus formed is positioned between separating sheets and then consolidated to a unitary thermoset decorative laminate 1.2 mm thick by heating at 145° C. under a pressure of 1400 psi in an hydraulic press. After cooling and removing the laminate from the press, the thermoset decorative laminate so obtained is substantially identical in appearance and properties as set forth in Example 3.

EXAMPLE 40

Using the apparatus of the type described in Example 39, semi-thermochemical softwood pulp is fed to the air-swept hammermill and there defibrated to an average fiber length of about 1.5 mm in the presence of a stream of humidified air at a relative humidity of about 70% flowing at a rate of 40.9 cubic meters of air per kilogram of fiber.

The resultant air-fiber stream leaving the mill is passed via suitable ducting to the distributor and a particulate thermosetting resin of mean particle size of about 20 microns and fine laminate cutting dust of 15–150 microns are incorporated into the air-fiber stream at a weight ratio of fiber to resin of 2.5 to 1 by means of a screw feeder adapted to feed material into the ducting. The air-fiber-filler resin is agitated in the distributor by the impeller means and caused by the suction means to pass through the perforated bottom-wall and deposit, upon the foraminous belt moving at 0.8 m/minute a fiber-filler- resin layer having a basis weight of 1260 gsm, a thickness of about 30 mm and a density of 0.042 g/cc. The deposited layer and the moving belt are then passed through the nip of the compaction rollers operating at a line loading of 45 Kg/cm and the deposited layer emerging from the nip is separated from the wire to provide a thermo-setting resin containing monostichous substrate of randomly oriented, substantially non-hydrogen bonded, cellulosic fibers having a thickness of 6 mm.

A decorative thermosetting plastics laminate assembly is formed comprising, in superimposed relationship:

(a) the monostichous substrate formed above;

(b) a printed decor paper impregnated with a thermosetting melamine-formaldehyde resin to a resin content of about 40%; and (c) an alpha-cellulose overlay sheet impregnated with a thermosetting melamine-formaldehyde resin to a resin content of about 60%; and after positioning between separating sheets the assembly is consolidated to a unitary thermoset decorative laminate comprising:

(a) a monostichous core layer, about 0.9 mm thick of randomly oriented, substantially non-hydrogen bonded cellulosic fibers, containing about 28% of thermoset phenolic resin and 12% filler cutting dust;

(b) a decorative layer comprising the thermoset melamine-formaldehyde resin impregnated printed decor paper sheet; and (c) a wear surface layer comprising the thermoset melamine-formaldehyde resin impregnated alpha cellulose overlay sheet.

The resultant laminate has excellent properties and surface appearance.

EXAMPLE 41

The procedure of Example 19 is again followed except that the overlay is omitted. Again, the high pressure decorative laminate produced from the monostichous substrate is of excellent mechanical strength and dimensional properties.

EXAMPLE 42

The procedure of Example 37 is again followed except that the air-laid web contains 24.9% of a 50/50 mixture of a first Novalac phenolic resin containing hexamethylenediamine and a second resole phenolic resin. The finished high pressure decorative laminate has excellent properties.

EXAMPLE 43

The procedure of Example 31 is again followed except that the air-deposited fibers are composed of 95% linerboard and 5% fiberboard mechanical pulp. The properties of the resultant high pressure decorative laminate are excellent.

EXAMPLE 44

When the procedure of Example 32 is again followed, except that the fibers are first sprayed with the phenolic resin and dried before depositing them on the foraminous belt, and the resultant monostichous substrate is employed in the manufacture of a laminate substantially equivalent results are achieved.

We claim:

1. A heat and pressure consolidated decorative laminate comprising, in superimposed relationship, (a) a monostichous layer of randomly oriented, substantially non-hydrogen bonded, air-laid cellulosic fibers of from about 0.25 mm to 2.25 mm thickness and containing from about 10 to 40%, by weight, based on the total weight of fiber and resin in (a), of a thermoset resin and from about 1% to about 20%, by weight, based on the total weight of said fiber, of pulverized, particulate filler having a particle size no larger than about 200 microns, and (b) a thermoset resin impregnated cellulosic print sheet.

2. A laminate in accordance with claim 1 containing, positioned atop said (b), (c) a thermoset resin impregnated α-cellulose, transparent overlay sheet.

3. A laminate in accordance with claim 1 wherein said fibers are cellulosic kraft fibers.

4. A laminate in accordance with claim 1 wherein said thermoset resin in (a) is a phenolic resin.

5. A laminate according to claim 1 wherein said filler is selected from the group consisting essentially of (1) laminate sander dust, (2) laminate cutting dust, (3) laminate edge trimming, (4) pulverized laminate and (5) resin impregnated paper.

* * * * *